United States Patent
Mills et al.

(10) Patent No.: US 11,637,478 B2
(45) Date of Patent: Apr. 25, 2023

(54) PULLEY ASSISTED ELECTROMAGNETIC WATER PUMP

(71) Applicant: Hanon Systems EFP Canada Ltd., Concord (CA)

(72) Inventors: Kyle D. Mills, Etobicoke (CA); Darrell F. Greene, Bradford (CA)

(73) Assignee: Hanon Systems EFP Canada Ltd., Concord (CA)

( * ) Notice: Subject to any disclaimer, the term of this patent is extended or adjusted under 35 U.S.C. 154(b) by 439 days.

(21) Appl. No.: 16/917,977

(22) Filed: Jul. 1, 2020

(65) Prior Publication Data

US 2021/0017996 A1    Jan. 21, 2021

Related U.S. Application Data

(60) Provisional application No. 62/876,081, filed on Jul. 19, 2019.

(51) Int. Cl.
*H02K 7/10* (2006.01)
*F04D 13/06* (2006.01)
(Continued)

(52) U.S. Cl.
CPC .......... *H02K 7/1008* (2013.01); *F04D 13/06* (2013.01); *F04D 29/007* (2013.01); *F16H 55/36* (2013.01);
(Continued)

(58) Field of Classification Search
CPC ........ F04D 13/06; F04D 29/007; F04D 15/02; F04D 15/0245; F04D 15/0254;
(Continued)

(56) References Cited

U.S. PATENT DOCUMENTS

2002/0108373 A1   8/2002   Frey
2008/0020875 A1   1/2008   Serrels et al.
(Continued)

FOREIGN PATENT DOCUMENTS

| DE | 4333907 A1 | 4/1995 |
|---|---|---|
| DE | 102013224838 A1 | 6/2015 |
| FR | 3068306 A1 | 1/2019 |

OTHER PUBLICATIONS

International Search Report regarding International Application No. PCT/IBS2020/056357, dated Nov. 19, 2020 (English translation provided.).

*Primary Examiner* — Michael Andrews
(74) *Attorney, Agent, or Firm* — Harness, Dickey & Pierce, P.L.C.

(57) ABSTRACT

An electrically and mechanically driven automotive accessory including a housing, an electric motor, a pulley, and a pulley assist mechanism. The electric motor comprises a stator assembly that is mounted to the housing and a rotor assembly that is mounted to a shaft. The electric motor creates a primary torque flow path that drives rotation of the rotor assembly relative to the stator assembly. The pulley is rotatable relative to the shaft and the rotor assembly. The pulley assist mechanism includes a plurality of claw-pole structures that are arranged circumferentially about the rotor assembly and an electromagnet that is configured to induce a magnetic field between the claw-pole structures and the pulley, which creates a secondary torque flow path between the pulley and the rotor assembly.

20 Claims, 5 Drawing Sheets

(51) Int. Cl.
  *F16H 55/36*    (2006.01)
  *F04D 29/00*    (2006.01)
  *H02K 7/08*     (2006.01)
  *H02K 1/24*     (2006.01)

(52) U.S. Cl.
  CPC ............. *H02K 1/243* (2013.01); *H02K 7/088* (2013.01); *H02K 2207/03* (2013.01)

(58) Field of Classification Search
  CPC ...... F16H 55/36; H02K 7/1008; H02K 7/088; H02K 1/243; H02K 2207/03
  USPC ....................................................... 310/75 R
  See application file for complete search history.

(56) References Cited

U.S. PATENT DOCUMENTS

| | | | |
|---|---|---|---|
| 2014/0023526 A1 | 1/2014 | Roby | |
| 2014/0174873 A1* | 6/2014 | Qin | F16D 13/38 |
| | | | 192/66.32 |
| 2016/0190728 A1* | 6/2016 | VanZuilen | H01R 13/5202 |
| | | | 310/71 |
| 2017/0037853 A1* | 2/2017 | Modica | F04D 13/021 |
| 2018/0179923 A1* | 6/2018 | Shepherd | F01M 1/02 |
| 2020/0321828 A1* | 10/2020 | Mills | F04B 17/03 |
| 2021/0310491 A1* | 10/2021 | McCarroll | H02K 7/11 |

* cited by examiner

PULLEY ASSISTED ELECTROMAGNETIC WATER PUMP

CROSS-REFERENCE TO RELATED APPLICATIONS

This application claims the benefit of U.S. Provisional Application No. 62/876,081, filed on Jul. 19, 2019. The entire disclosure of the above application is incorporated herein by reference.

FIELD

The subject disclosure is generally directed to electrically and mechanically driven automotive accessories, including without limitation, electrically and mechanically driven automotive pumps. The subject disclosure is also directed to methods of operating the same.

BACKGROUND

This section provides background information related to the present disclosure which is not necessarily prior art.

Automobiles typically include a variety of different automotive accessories that are either driven by electric motors or driven mechanically off of the engine, and more particularly, off of an accessory belt that is driven by the crankshaft of the engine. Examples include pumps for pumping coolant, oil, transmission fluid, and fuel. Further examples include pumps for pumping engine intake air, which are sometimes referred to as compressors. Mechanically driven automotive accessories suffer from several disadvantages, chief among them being that they cannot be driven when the engine is not running. In addition, the rotational speed and thus the output of mechanically driven automotive accessories is dependent upon engine speed. Therefore, the speed and output of typical mechanically driven automotive accessories cannot be controlled independently of the engine speed.

Electrically driven automotive accessories solve the problems associated with typical mechanically driven automotive accessories, but carry with them their own disadvantages. Most automotive electrical systems generate and run on 12 volts (V) direct current (DC). There are practical limits on the power of electric motors that can be run off of 12 volts (V) direct current (DC) because once a certain power level is exceeded, the heat generated by the electric motor becomes difficult to manage and can cause the electronics to overheat. This makes it difficult to provide an electrically powered automotive accessory capable of delivering an output of 1 kilowatt (kW) while still utilizing a power supply that runs off 12 volts (V) direct current (DC). Accordingly, automobile manufacturers must settle for less powerful electrically driven automotive accessories if they want an automobile accessory that can be driven independently of engine speed and when the engine is not running.

SUMMARY

This section provides a general summary of the disclosure, and is not a comprehensive disclosure of its full scope or all of its features.

In accordance with one aspect of the present disclosure, an electrically and mechanically driven automotive accessory is provided. The electrically and mechanically driven automotive accessory includes a housing, an electric motor configured to rotationally drive a shaft, and a pulley that is rotatable relative to both the electric motor and the shaft. The shaft is rotatably supported in the housing and extends along a longitudinal axis between an input end and an output end. The electric motor comprises a stator assembly and a rotor assembly. When the electric motor is activated, the electric motor creates a primary torque flow path that drives rotation of the rotor assembly relative to the stator assembly. The stator assembly is fixedly mounted to the housing. The rotor assembly is fixedly mounted to the shaft such that the rotor assembly rotates with the shaft. The pulley is rotatably supported on the input end of the shaft such that the pulley is rotatable relative to the shaft and the rotor assembly. The electrically and mechanically driven automotive accessory has a pulley assist mechanism. The pulley assist mechanism includes an electromagnet and a plurality of claw-pole structures that are arranged circumferentially about the rotor assembly. When the electromagnet is activated, a magnetic coupling is formed between the claw-pole structures and the pulley due to the magnetic field generated by the electromagnet. This magnetic coupling creates a secondary torque flow path between the pulley and the rotor assembly.

In accordance with another aspect of the present disclosure, a method of operating the electrically and mechanically driven automotive accessory described above is provided. The method includes the step of applying electricity to electrical windings of the stator assembly to generate an electromagnetic field and a primary torque flow path that rotationally drives the rotor assembly and the shaft. The method also includes the step of rotationally driving the pulley, which is rotatably supported on a pulley bearing assembly. The method proceeds with the steps of detecting a first rotational speed of the rotor assembly or the shaft and detecting a second rotational speed of the pulley. The method further comprises the step of activating the pulley assist mechanism when the second rotational speed is greater than the first rotational speed. The step of activating the pulley assist mechanism includes applying electricity to the electromagnet of the pulley assist mechanism to induce a magnetic field between the pulley and claw-pole structures on the rotor assembly to create a secondary torque flow path between the pulley and the rotor assembly.

The secondary torque flow path provided by the pulley assist mechanism adds to the primary torque flow path produced by the electric motor, which allows the rotor assembly to be driven at a higher rotational speed than would otherwise be possible by utilizing only the primary torque flow path. As a result, the electrically and mechanically driven automotive accessory described herein can generate 1.7-1.8 kilowatt (kW) of pumping power utilizing an electric motor that runs off of 12 volts (V) direct current (DC). Additionally, the electric current supplied to the electrical windings of the stator assembly can be reduced for any given rotational speed when the electromagnet of the pulley assist mechanism is activated. This means that higher rotational speeds and power output are possible while retaining an electric motor that runs on a 12 volt power supply without overheating. The pulley assist mechanism also allows the electric motor to be downsized because peak demand usually coincides with high engine speeds, where the rotational speed of the pulley is high and the pulley assist mechanism is most effective (i.e., when the pulley assist mechanism can provide the largest increase in rotational speed to the rotor assembly).

Unlike mechanically driven automotive accessories, the electrically and mechanically driven automotive accessory described herein can be driven by just the electric motor when the engine of the vehicle is not running. Additionally, the rotational speed of the shaft is fully variable and can be controlled independently of the speed of the engine. The electric current applied to the electromagnet of the pulley assist mechanism can be controlled to vary the degree of magnetic coupling between the finger of the pulley and the rotor assembly. As a result, the amount of torque transfer between the finger of the pulley and the rotor assembly through the secondary torque flow path can be adjusted to control the rotational speed of the shaft as well as the amount of mechanical drag the pulley places on the engine of the vehicle.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Referring to the Figures, wherein like numerals indicate corresponding parts throughout the several views, an electrically and mechanically driven automotive accessory 20 is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
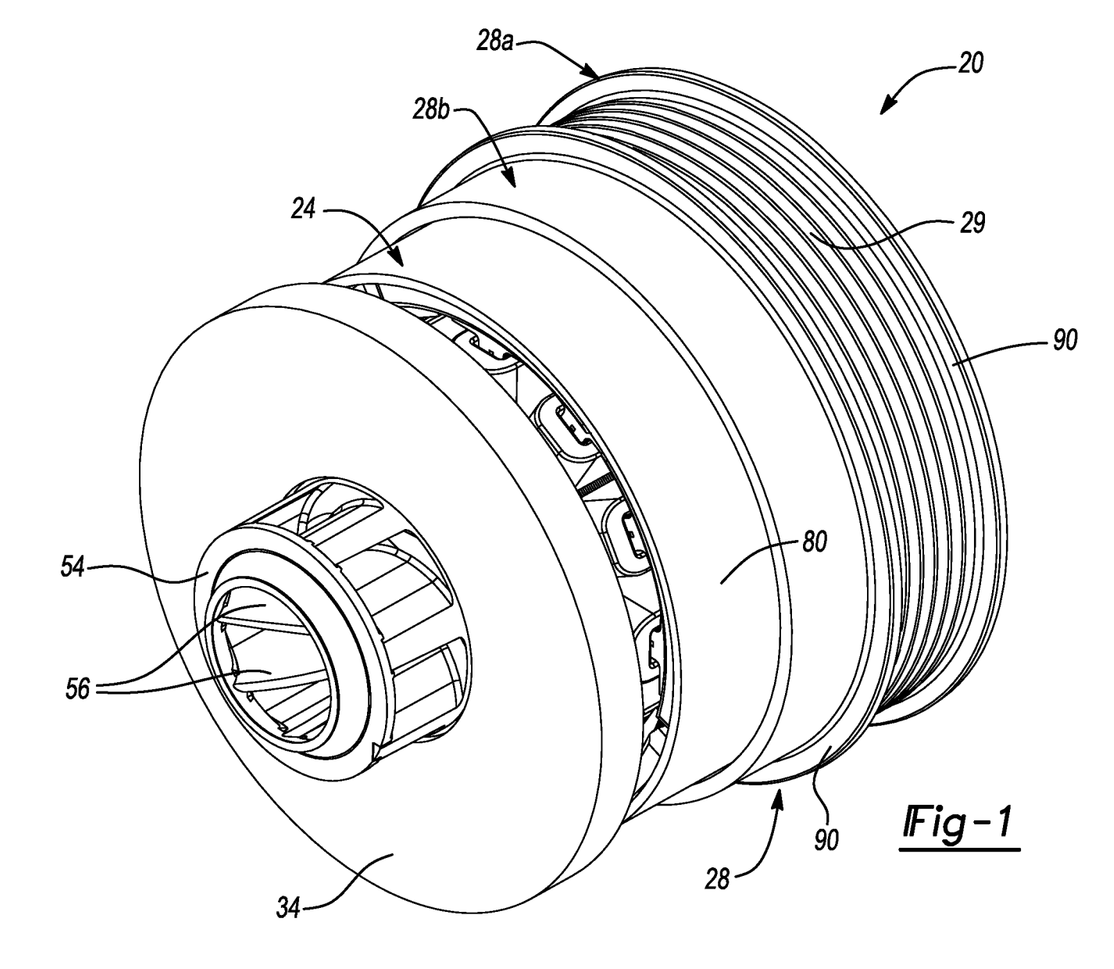
FIG. 1 is a side perspective view of an electrically and mechanically driven automotive accessory that has been constructed in accordance with the teachings of the present disclosure.
Figure 2:
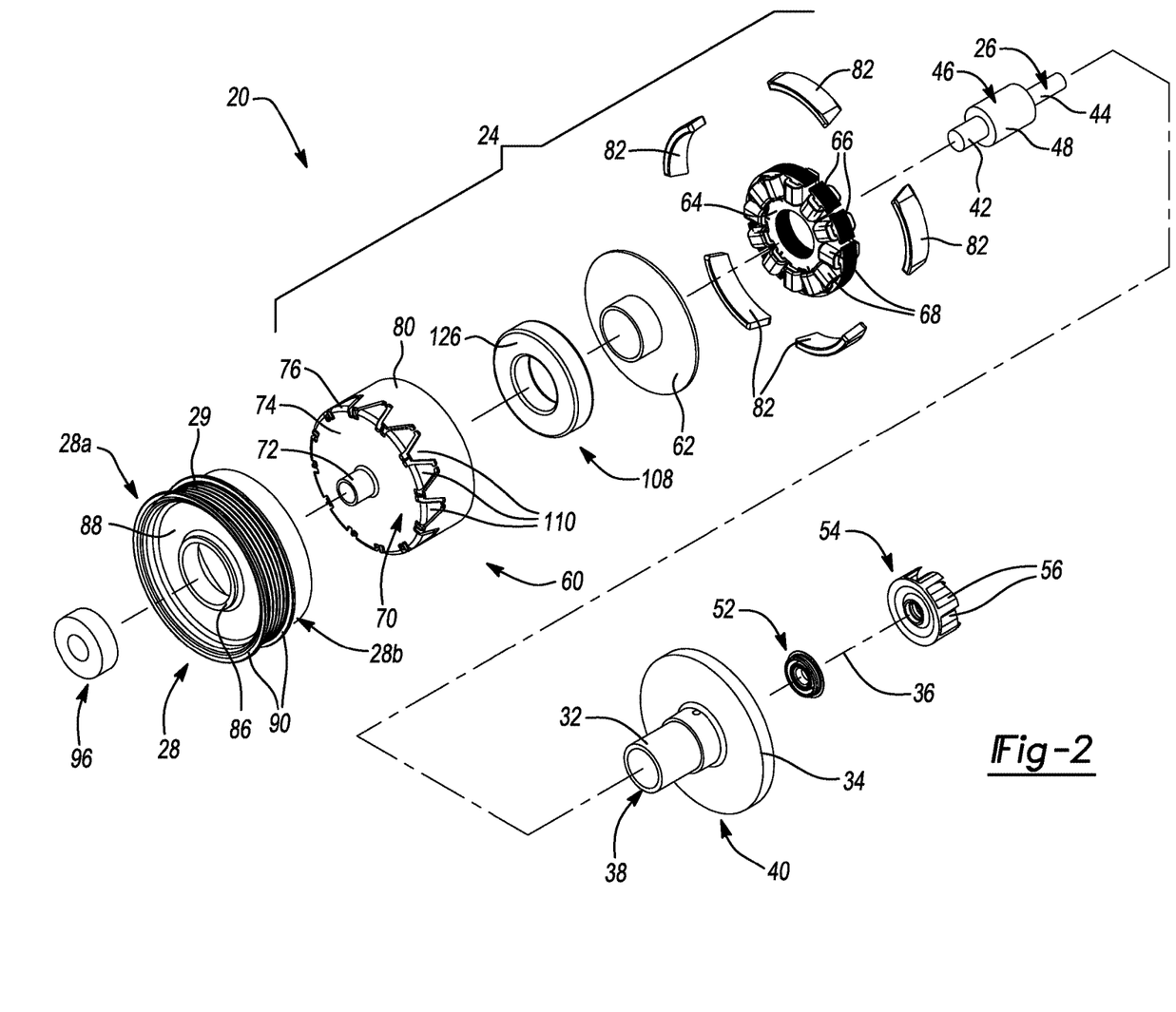
FIG. 2 is an exploded perspective view of the electrically and mechanically driven automotive accessory illustrated in FIG. 1.
Figure 3:
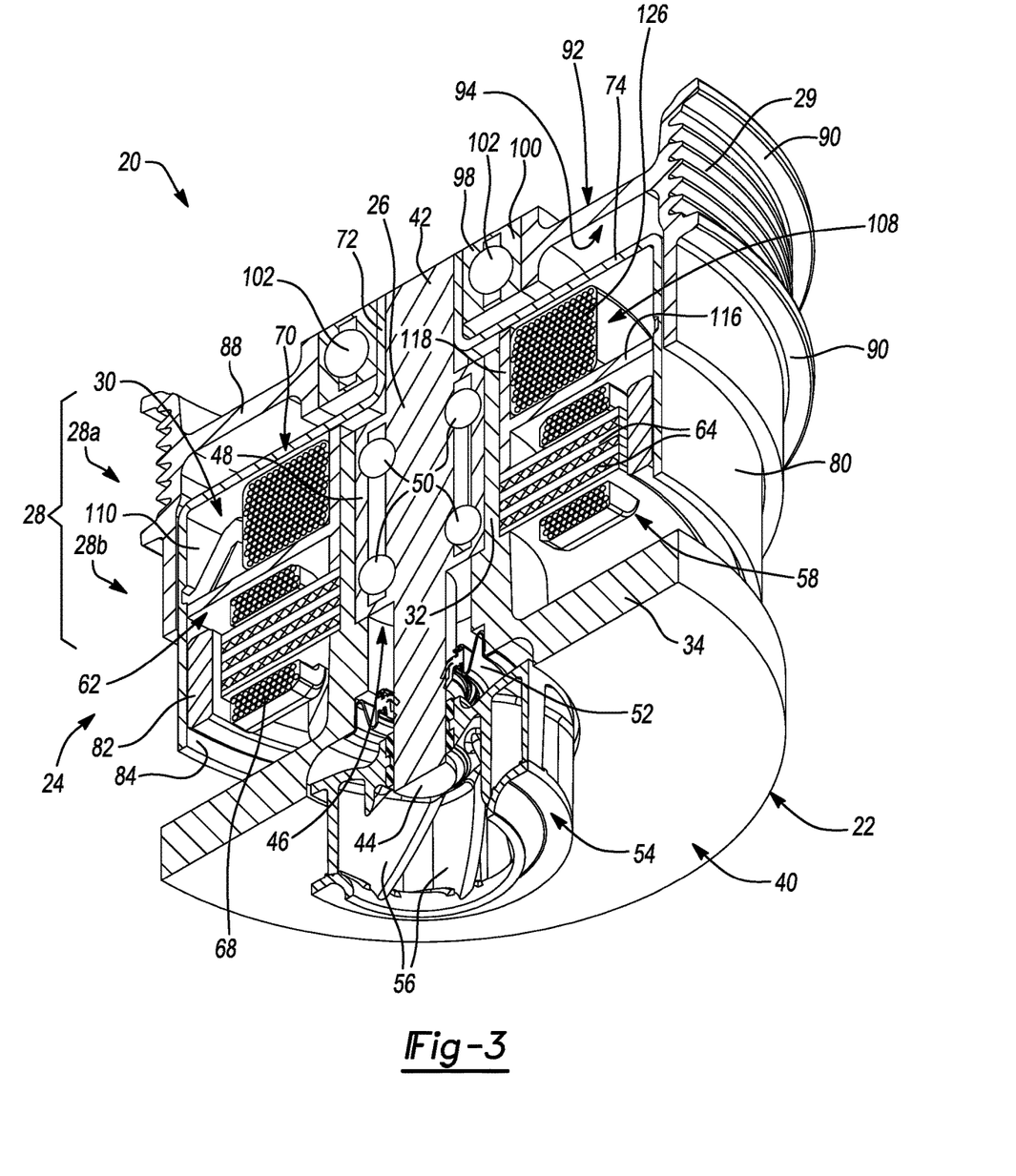
FIG. 3 is a side section view of the electrically and mechanically driven automotive accessory illustrated in FIG. 1.

With reference to FIGS. 1-3, the electrically and mechanically driven automotive accessory 20 disclosed herein includes a housing 22, an electric motor 24 configured to rotationally drive a shaft 26, and a pulley 28 that is rotatable relative to both the electric motor 24 and the shaft 26. The pulley 28 includes a belt contact portion 28a with a belt contact surface 29 and a secondary torque transfer portion 28b. The secondary torque transfer portion 28b extends longitudinally from the belt contact portion 28a and annularly about at least a portion of the electric motor 24. The belt contact portion 28a of the pulley 28 is configured to be rotationally driven by a belt (not shown), such as a rubber accessory belt, that is driven by an engine (not shown). The belt contact surface 29 of the pulley 28 engages the belt and may optionally include a channel with grooves. The engine may be, without limitation, an internal combustion engine powering a vehicle (not shown). As will be explained in greater detail below, the electrically and mechanically driven automotive accessory 20 includes a pulley assist mechanism 30 that utilizes electromagnetism to transfer torque from the pulley 28 to parts of the electric motor 24 to provide a torque assist (i.e., a mechanical boost) to the electric motor 24 under certain operating conditions.

Although other configurations are possible, in the illustrated embodiment the housing 22 includes a tubular portion 32 and a flange portion 34. The tubular portion 32 extends annularly about the longitudinal axis 36 between a first housing end 38 and a second housing end 40. The flange portion 34 extends radially outwardly from the tubular portion 32 at the second housing end 40. The shaft 26 of the electrically and mechanically driven automotive accessory 20 is received in the tubular portion 32 of the housing 22. The shaft 26 extends along a longitudinal axis 36 between an input end 42 and an output end 44. It should therefore be appreciated that the term "longitudinal" used herein describes structures that are parallel/co-axial to the longitudinal axis 36. The shaft 26 is longer than the tubular portion 32 of the housing 22 such that the input end 42 of the shaft 26 extends out from the first housing end 38 and the output end 44 of the shaft 26 extends out from the second housing end 40. The shaft 26 is rotatably supported in the tubular portion 32 of the housing 22 by a shaft bearing assembly 46. Although other configurations are possible, the shaft bearing assembly 46 may have an integrated shaft 26 bearing arrangement with an outer sleeve 48 that is press fit into the tubular portion 32 of the housing 22 and two longitudinally spaced ball bearing packs 50 that are positioned radially between the shaft 26 and the outer sleeve 48. During operation, the housing 22 may remain stationary while the shaft bearing assembly 46 allows the shaft 26 to rotate about the longitudinal axis 36 and relative to the housing 22.

Both the housing 22 and the shaft 26 may be made of a wide variety of different materials, including without limitation, various metals. In the illustrated embodiment, the shaft 26 is stepped where the shaft 26 has a larger diameter at the input end 42 and a smaller diameter at the output end 44; however, it should be appreciated that other configurations are possible, including configurations where the shaft 26 has a constant diameter along its entire length. Optionally, a shaft seal 52, extending annularly about the shaft 26, may be provided adjacent to the output end 44 of the shaft 26. In the illustrated example, the shaft seal 52 is made of a resilient material and is positioned radially between the shaft 26 and the housing 22. The shaft seal 52 in this example is fixed to the housing 22 such that the shaft 26 rotates relative to the shaft seal 52; however, in an alternative embodiment, the shaft seal 52 may be fixed to the shaft 26 such that it rotates with the shaft 26 and relative to the stationary housing 22.

In the illustrated example, the electrically and mechanically driven automotive accessory 20 is a fluid pump, such as a pump for pumping liquid. Such liquids may include, but are not limited to, water, coolant, oil, transmission fluid, or fuel. In accordance with this embodiment, the electrically and mechanically driven automotive accessory 20 includes an impeller 54 that is fixedly mounted to the output end 44 of the shaft 26. The impeller 54 includes one or more vanes 56. The impeller 54 can be made of a wide range of materials, including without limitation, injection molded plastic. During operation, the impeller 54 rotates with the shaft 26, which causes the vanes 56 of the impeller 54 to pump liquid through the fluid pump. However, it should be appreciated that the scope of the present disclosure is not limited to liquid pumps. For example, the electrically and mechanically driven automotive accessory 20 may be configured as an air pump (also known as an air compressor). In other non-limiting examples, the electrically and mechanically driven automotive accessory 20 could also be other automotive accessories that are typically driven by an electric motor 24, an accessory belt off the engine, the serpentine belt of the engine, the crankshaft of the engine, or a camshaft of the engine.

The electric motor 24 is configured to create a primary torque flow path that drives rotation of the shaft 26 when the electric motor 24 is activated. Although other configurations are possible, the electric motor 24 in the illustrated embodiment comprises a stator assembly 58 and a rotor assembly 60. The stator assembly 58 is fixedly mounted on the tubular portion 32 of the housing 22 and therefore remains stationary during operation. The electrically and mechanically driven automotive accessory 20 includes a stationary backing member 62 and the stator assembly 58 includes a plurality of stator plates 64, all of which are fixedly mounted on the tubular portion 32 of the housing 22. The stator plates 64 are stacked together and include a plurality of arms 66 that support electrical windings 68. Although other configurations are possible, in the illustrated embodiment, the stator plates 64 are made of metal and the electrical windings 68 are made of copper wire. Although other configurations are possible, the stator plates 64 and the electrical windings 68 may be encased in a resin or a plastic to protect them from corrosion/oxidation, vibration, contaminants, and impact damage and to structurally unitize the stator assembly 58.

The rotor assembly 60 is rotatable relative to the stator assembly 58 about the longitudinal axis 36. The rotor assembly 60 includes a hub 70 that is fixedly mounted to the shaft 26 such that the rotor assembly 60 rotates with the shaft 26. More specifically, in the illustrated embodiment, the hub 70 includes a cylindrical portion 72 that is press fit onto the input end 42 of the shaft 26. The hub 70 includes a flange 74 that extends radially outwardly from the cylindrical portion 72 to a perimeter edge 76. Accordingly, the hub 70 forms part of an end face 78 of the rotor assembly 60, which faces toward the pulley 28. The rotor assembly 60 also includes a rotating backing member 80. The rotating backing member 80 extends longitudinally from the perimeter edge 76 of the hub 70 and circumferentially about at least a portion of the stator assembly 58. It should be appreciated that the words "stationary" and "rotating" used to describe the backing members 62, 80 of the electric motor 24 are merely used for labelling purposes and refer to the relative motion between these two components when the electric motor 24 is running.

Permanent magnets 82 are fixedly mounted to the rotating backing member 80 and are spaced radially outward of the stator plates 64. When electricity (i.e., electric current) is applied to the electrical windings 68 of the stator assembly 58, an electromagnetic field is created that interacts with the magnetic field of the permanent magnets 82, which causes the rotating backing member 80 to rotate. The hub 70 and the rotating backing member 80 hub are integral with each other and form a one-piece structure such that the electric motor 24 rotationally drives the shaft 26 when electricity is applied to the electrical windings 68 of the stator assembly 58. Although other configurations are possible, the hub 70 and the rotating backing member 80 may be made of a ferrous metal material and the permanent magnets 82 of the rotor assembly 60 may be made of a ferritic material or rare earth materials, such as samarium cobalt (SmCo) or neodymium-iron boron (NdFeB), and may be glued to an inside surface 84 of the rotating backing member 80.

The pulley 28 is rotatably supported on the input end 42 of the shaft 26 such that the pulley 28 is rotatable relative to the shaft 26 and the rotor assembly 60. In the illustrated example, the belt contact portion 28a of the pulley 28 has a hub portion 86, a pulley wall 88, and two annular rims 90. The pulley wall 88 extends radially outwardly from the hub portion 86 and the belt contact surface 29 is positioned between the two annular rims 90. The belt contact surface 29 is configured to mate with (i.e., contact) the belt (not shown), while the two annular rims 90 of the pulley 28 are configured to help prevent the belt from sliding/jumping off of the pulley 28. The pulley wall 88 includes an outboard face 92 that faces away from the flange 74 of the hub 70 of the rotor assembly 60 and an inboard face 94 that faces toward the flange 74 of the hub 70 of the rotor assembly 60. The pulley 28 is supported by a pulley bearing assembly 96 that is positioned radially between the cylindrical portion 72 of the hub 70 of the rotor assembly 60 and the hub portion 86 of the pulley 28. Although other configurations are possible, in the illustrated embodiment, the pulley bearing assembly 96 includes an inner race 98 that is press fit on the cylindrical portion 72 of the hub 70 of the rotor assembly 60, an outer race 100 that is press fit into the hub portion 86 of the pulley 28, and a plurality of ball bearings 102 that are positioned radially between the inner and outer races 98, 100. As a result, the pulley 28 can rotate relative to the housing 22 and the stator assembly 58, which remain stationary, and relative to the shaft 26 and the rotor assembly 60, which can rotate independently of the pulley 28.

Figure 4:
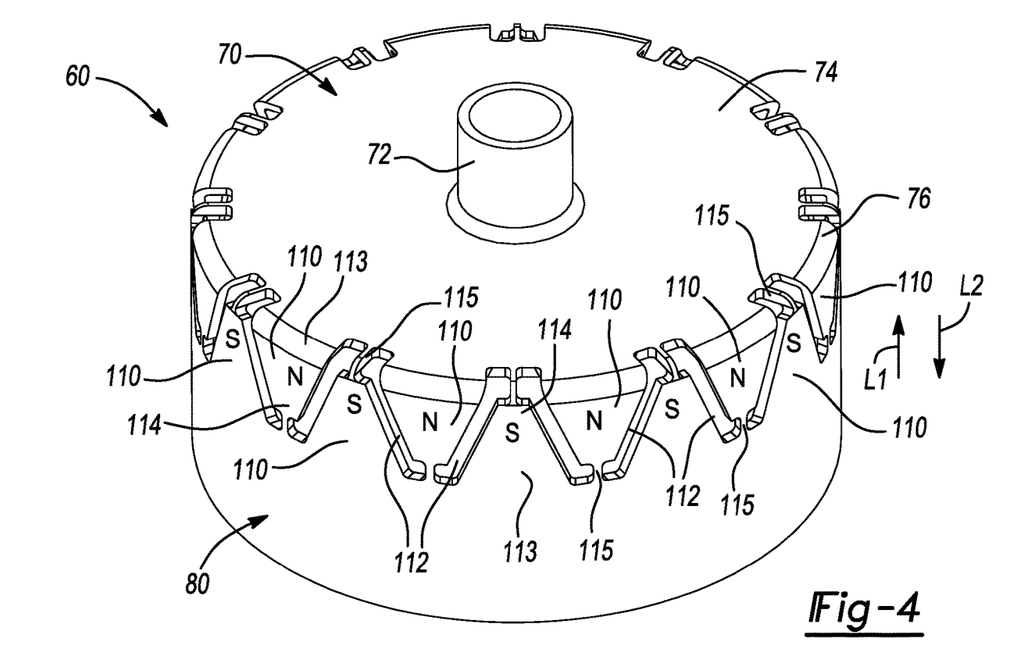
FIG. 4 is a side perspective view of an exemplary rotor assembly of the electrically and mechanically driven automotive accessory illustrated in FIG. 1.
Figure 5:
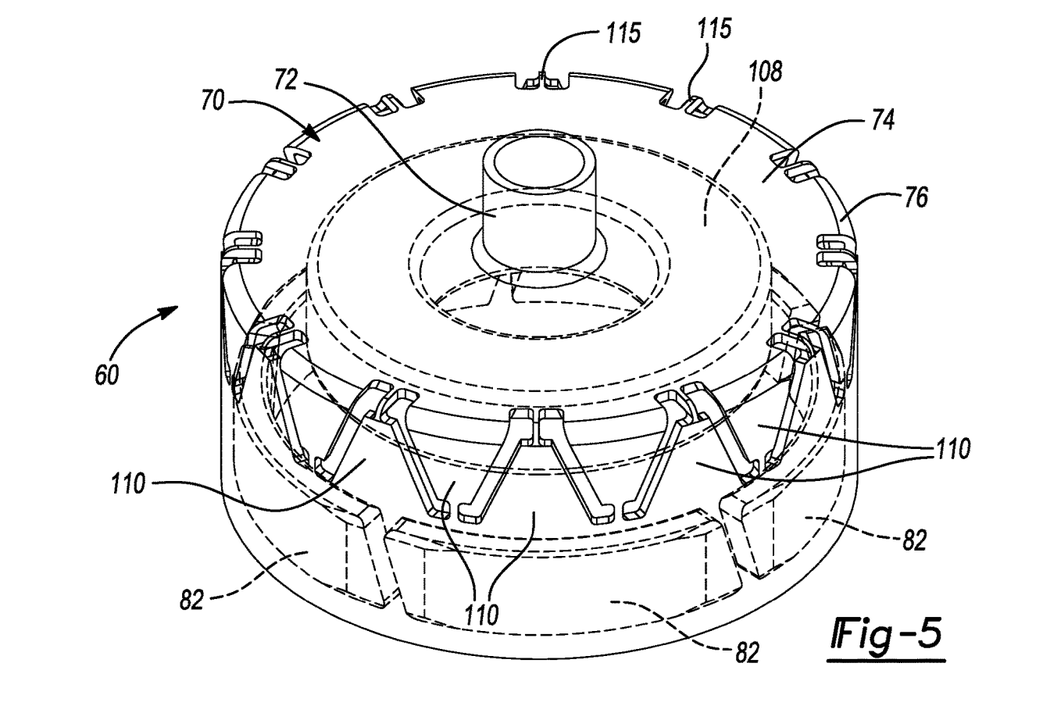
FIG. 5 is another side perspective view of the rotor assembly illustrated in FIG. 4, where the internal components of the rotor assembly are shown in dashed lines.

With additional reference to FIGS. 4 and 5, the pulley assist mechanism 30 includes an electromagnet 108 that is supported on the stationary backing member 62 and a plurality of claw-pole structures 110 that are arranged circumferentially about the rotating backing member 80 of the rotor assembly 60. The claw-pole structures 110 are disposed along the rotating backing member 80 at circumferentially spaced locations near the perimeter edge 76 of the hub 70. Adjacent claw-pole structures 110 alternate polarities between a north pole N and a south pole S (i.e., adjacent claw-pole structures 110 have alternating di-poles) when the electromagnet 108 is energized and are separated by magnetic gaps 112 provided in the stationary backing member 62 of the rotor assembly 60. It should also be appreciated that the polarities of the claw-pole structures 110 may switch or change each time the electromagnet 108 is de-activated and re-activated. Each of the claw-pole structures 110 has a triangular shape with a base 113 and an apex 114. The apices 116 of adjacent claw-pole structures 110 point in opposite longitudinal directions L1 and L2 and the magnetic gaps 112 between the claw-pole structures 110 generally have a Z-like shape. A plurality of fingers 115 structurally connect the apices 114 of the claw pole structures 110 to the flange 74 of the hub 70 and the rotating backing member 80. The fingers 115 allow the hub 70 and the rotating backing member 80 to be made as a one-piece component for reduced manufacturing costs. At the same time, the fingers 115 are thin enough to provide a relatively uninterrupted magnetic gaps 112 around the claw-pole structures 110. To reduce magnetic losses at the fingers 115, the fingers 115 could alternatively be made of a non-magnetic material, such as aluminum or plastic.

The secondary torque transfer portion 28b of the pulley 28 is cylindrical in shape and extends annularly about the claw-pole structures 110, such that the secondary torque transfer portion 28b of the pulley 28 overlays the claw-pole structures 110 of the rotor assembly 60. The electromagnet 108 is configured to induce a magnetic field between the claw-pole structures 110 in the rotating backing member 80 and the secondary torque transfer portion 28b of the pulley 28. This magnetic field crosses the claw-pole structures 110 and jumps to the secondary torque transfer portion 28b of the pulley 28 to create a secondary torque flow path between the pulley 28 and the rotor assembly 60 when the electromagnet 108 is activated (i.e., energized). In some configurations, the entire pulley 28 may be made of a magnetic metal. In other configurations the secondary torque transfer portion 28b of the pulley 28 may be made of a magnetic metal material while the belt contact portion 28a of the pulley 28, or portions thereof, such as the hub portion 86, pulley wall 88, and/or annular rims 90, may be made of other materials, including non-magnetic materials.

Figure 6:
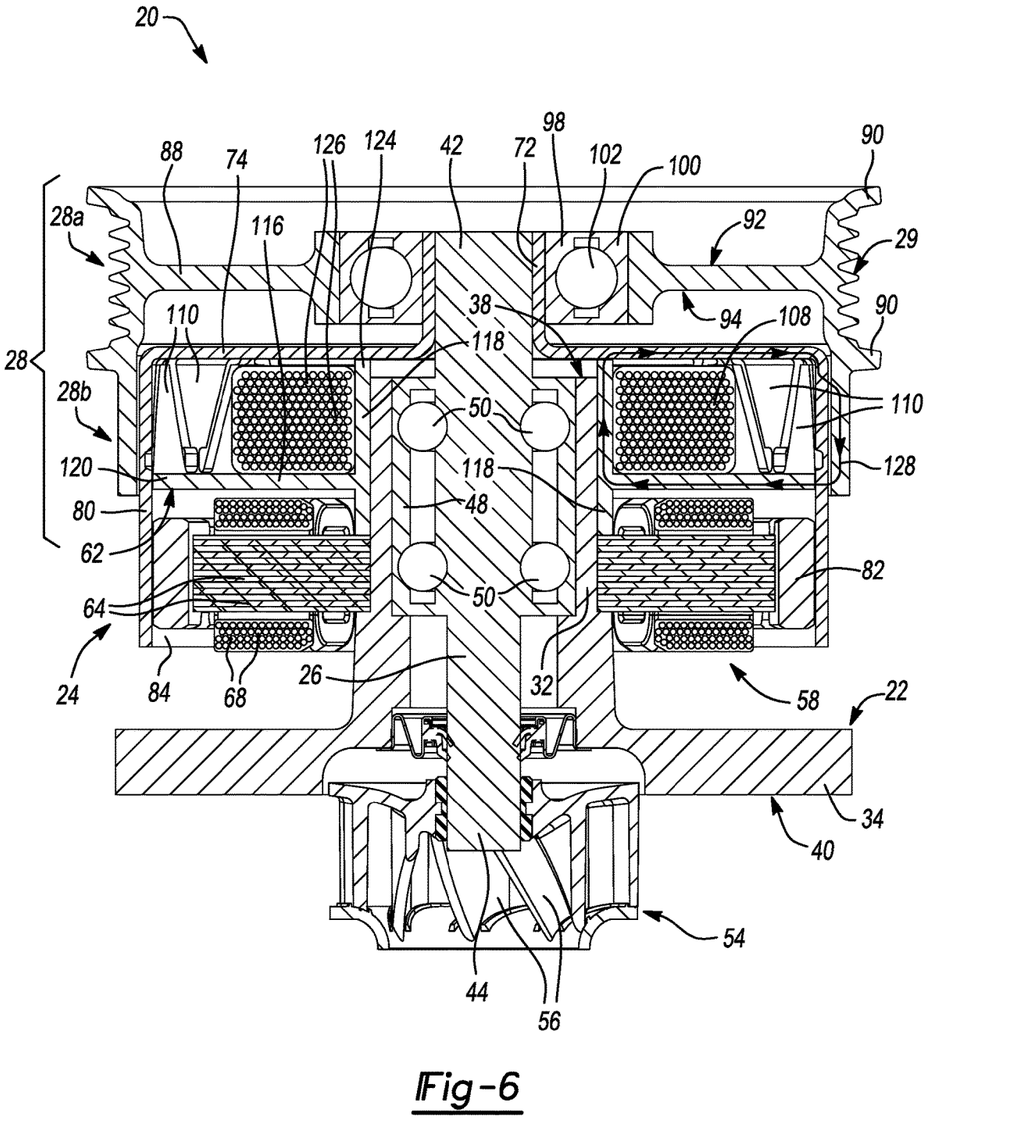
FIG. 6 is a side cross-sectional view of the electrically and mechanically driven automotive accessory illustrated in FIG. 1.

With additional reference to FIG. 6, the stationary backing member 62 includes a first wall 116 that extends radially between a flanged inner edge 118 and an outer edge 120. The flanged inner edge 118 of the stationary backing member 62 is press fit onto the tubular portion 32 of the housing 22. The inner flanged edge 118 extends longitudinally from the first wall 116 to a distal end 124 positioned near the flange 74 of the hub 70 of the rotor assembly 60. Accordingly, the first wall 116 of the stationary backing member 62 is perpendicular to the longitudinal axis 36 and the inner flanged edge 118 of the stationary backing member 62 is perpendicular to the first wall 116 and parallel/co-axial to the longitudinal axis 36. The stationary backing member 62 supports the electromagnet 108 of the pulley assist mechanism 30. For example, in the illustrated embodiment, the electromagnet 108 is a wire coil 126 of copper wire that is wound about the inner flanged edge 118 such that the wire coil 126 of the electromagnet 108 is positioned radially between the inner flanged edge 118 of the stationary backing member 62 and the rotating backing member 80 and longitudinally between the first wall 116 of the stationary backing member 62 and the flange 74 of the hub 70 of the rotor assembly 60.

The stationary backing member 62, the rotating backing member 80 of the rotor assembly 60, and the hub 70 of the rotor assembly 60 are all made of a magnetic material, such as a ferrous metal material. As best seen in FIG. 6, when electricity (i.e., electric current) is applied to wire coil 126, the electromagnet 108 of the pulley assist mechanism 30 induces a magnetic loop 128 in portions of the hub 70 (i.e., in flange 74), the stationary backing member 62 (i.e., in portions of the first wall 116 and the inner flanged edge 118), the rotating backing member 80 (i.e., in the claw pole structures 110), and the pulley 28 (i.e., in portions of the secondary torque transfer portion 28b). When the electromagnet 108 of the pulley assist mechanism 30 is deactivated (i.e., de-energized), the magnetic coupling between the pulley 28 and the rotating backing member 80 ends. As a result, there is no torque transfer between the pulley 28 and the rotor assembly 60 when the electromagnet 108 is deactivated. However, when the electromagnet 108 of the pulley assist mechanism 30 is activated (i.e., energized), the magnetic field induced between the secondary torque transfer portion 28b of the pulley 28 and the claw pole structures 110 of the rotor assembly 60 results in torque transfer between the pulley 28 and the rotor assembly 60.

There are a number of predetermined tolerances (i.e., small gaps) between the outer edge 120 of the stationary backing member 62 and the inside surface 84 of the rotating backing member 80 and between the distal end 124 of the inner flanged edge 118 of the stationary backing member 62 and the flange 74 of the hub 70. These tolerances must be small enough to provide a relatively uninterrupted magnetic loop 128 when the electromagnet 108 is activated, but large enough to accommodate manufacturing tolerances and permit relative motion between the rotor assembly 60 and the stator assembly 58 and relative motion between the rotor assembly 60 and the pulley 28. By way of example and without limitation, these predetermined tolerances may be 100-200 microns (μm) and preferably about 150 microns (μm).

The magnetic coupling between the secondary torque transfer portion 28b of the pulley 28 and the rotor assembly 60, requires relative motion between the pulley 28 and rotor assembly 60. Accordingly, there will always be some rotational slip between the pulley 28 and the rotor assembly 60, even when the electromagnet 108 is activated. The electromagnet 108 of the pulley assist mechanism 30 is only activated when the belt is driving the pulley 28 at a faster rotational speed than the rotational speed that the rotor assembly 60 is being driven at via the primary torque flow path produced by the electric motor 24. When the electromagnet 108 is activated in such conditions, the secondary torque flow path provided by the pulley assist mechanism 30 (i.e., the induced magnetic coupling between the secondary torque transfer portion 28b of the pulley 28 and the rotor assembly 60) adds to the primary torque flow path produced by the electric motor 24, which allows the rotor assembly 60 to be driven at a higher rotational speed (i.e., higher revolutions per minute/RPMs) than would be possible when utilizing only the primary torque flow path. As a result, the fluid flow generated by the impeller 54 is increased. Additionally, the electric current supplied to the electrical windings 68 of the stator assembly 58 can be reduced for any given rotational speed when the electromagnet 108 of the pulley assist mechanism 30 is activated.

In many cases, the pulley assist mechanism 30 also allows the electric motor 24 to be downsized because peak pump demand usually coincides with high engine speeds, where the rotational speed of the pulley 28 is high and the pulley assist mechanism 30 is most effective (i.e., when the pulley assist mechanism 30 can provide the largest increase in rotational speed to the rotor assembly 60). As explained below, the electromagnet 108 of the pulley assist mechanism 30 is deactivated when the primary torque flow path of the electric motor 24 is driving the rotor assembly 60 at a rotational speed that is faster than the rotational speed of the pulley 28. If the electromagnet 108 were not deactivated during such conditions, the pulley assist mechanism 30 would slow the rotation of the rotor assembly 60 and act as a brake, which would be undesirable in most applications.

Unlike mechanically driven automotive accessories, the electrically and mechanically driven automotive accessory 20 described herein can be driven by just the electric motor 24 when the engine of the vehicle is not running. Additionally, the rotational speed of the shaft 26 is fully variable and can be controlled independently of the speed of the engine. The electric current applied to the wire coil 126 of the electromagnet 108 can be controlled to vary the degree of magnetic coupling between the secondary torque transfer portion 28b of the pulley 28 and the rotor assembly 60. As a result, the amount of torque transfer between the secondary torque transfer portion 28b of the pulley 28 and the rotor assembly 60 can be adjusted to control the rotational speed of the shaft 26 as well as the amount of mechanical drag the pulley 28 places on the engine of the vehicle. In other words, the amount of load the electrically and mechanically driven automotive accessory 20 places on the engine can be controlled in view of the engine's speed, power output, fuel economy, and/or other operating parameters.

The electrically and mechanically driven automotive accessory 20 described above can be controlled according to the method of operation set forth below. The method includes the step of applying electricity to the electrical windings 68 of the stator assembly 58 to generate an electromagnetic field and a primary torque flow path that rotationally drives the rotor assembly 60, and thus, the shaft 26. The method also includes the step of rotationally driving the pulley 28, which is rotatably supported on the pulley bearing assembly 96. The method proceeds with the steps of detecting a first rotational speed of the rotor assembly 60 and/or the shaft 26 and detecting a second rotational speed of the pulley 28. The electrically and mechanically driven automotive accessory 20 may include one or more sensors (not shown) that are configured to measure/read the first rotational speed of the rotor assembly 60 and/or the shaft 26 and the second rotational speed of the pulley 28. The method further includes the step of activating the pulley assist mechanism 30 when the second rotational speed (i.e., the rotational speed of the pulley 28) is greater than the first rotational speed (i.e., the rotational speed of the rotor assembly 60/shaft 26). This step includes applying electricity to the electromagnet 108 to induce a magnetic field between the pulley 28 and the claw-pole structures 110 on the rotor assembly 60 to create a secondary torque flow path between the pulley 28 and the rotor assembly 60. The step of activating the pulley assist mechanism 30 produces the magnetic loop 128 described above, which extends around the electromagnet 108 in portions of the stator assembly 58, rotor assembly 60, and the pulley 28. The method may also include the step of deactivating the pulley assist mechanism 30 when the first rotational speed (i.e., the rotational speed of the rotor assembly 60/shaft 26) is greater than the second rotational speed (i.e., the rotational speed of the pulley 28). The steps of activating and deactivating the pulley assist mechanism 30 may be performed by a controller (not shown) adapted to control the output of one or more power supplies (not shown), which may be electrically connected to the wire coil 126 of the electromagnetic and/or the electrical windings 68 of the stator assembly 58.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims. In addition, the steps of the method set forth herein may be practiced in a different order than that listed herein without departing from the scope of the appended claims.

What is claimed is:

1. An electrically and mechanically driven automotive accessory, comprising:
a housing;
a shaft rotatably supported in said housing, said shaft extending along a longitudinal axis between an input end and an output end;
an electric motor comprising a stator assembly and a rotor assembly that is rotatable relative to said stator assembly, said electric motor being configured to create a primary torque flow path when said electric motor is activated;
said stator assembly fixedly mounted to said housing;

said rotor assembly fixedly mounted to said shaft such that said rotor assembly rotates with said shaft;

a pulley rotatably supported on said input end of said shaft such that said pulley is rotatable relative to said shaft and said rotor assembly; and a pulley assist mechanism including a plurality of claw-pole structures arranged circumferentially about said rotor assembly and an electromagnet configured to induce a magnetic field between said claw-pole structures and said pulley to create a secondary torque flow path between said pulley and said rotor assembly when said electromagnet is activated.

2. The electrically and mechanically driven automotive accessory set forth in claim 1, wherein adjacent claw-pole structures alternate polarities between a north pole and a south pole and are separated by magnetic gaps provided in said rotor assembly.

3. The electrically and mechanically driven automotive accessory set forth in claim 2, wherein said rotor assembly includes a hub that is fixed to and extends radially outwardly from said shaft to a perimeter edge and a rotating backing member that extends longitudinally from said perimeter edge of said hub and circumferentially about at least a portion of said stator assembly.

4. The electrically and mechanically driven automotive accessory set forth in claim 3, wherein said claw-pole structures are disposed along said rotating backing member at circumferentially spaced locations near said perimeter edge of said hub.

5. The electrically and mechanically driven automotive accessory set forth in claim 4, wherein said pulley includes a belt contact portion with a belt contact surface and a secondary torque transfer portion that extends longitudinally from said belt contact portion and annularly about said claw-pole structures of said rotor assembly.

6. The electrically and mechanically driven automotive accessory set forth in claim 5, wherein said belt contact portion of said pulley is configured to be driven by a belt.

7. The electrically and mechanically driven automotive accessory set forth in claim 5, wherein said secondary torque transfer portion of said pulley is cylindrical in shape and overlays said claw-pole structures of said rotor assembly.

8. The electrically and mechanically driven automotive accessory set forth in claim 4, wherein said each of said claw-pole structures of said rotor assembly has a triangular shape with a base and an apex.

9. The electrically and mechanically driven automotive accessory set forth in claim 8, wherein said apices of adjacent claw-pole structures point in opposite longitudinal directions and wherein said rotor assembly includes a plurality of fingers that structurally connect said apices of said claw pole structures to said hub and said rotating backing member.

10. The electrically and mechanically driven automotive accessory set forth in claim 3, further comprising:

a stationary backing member that is fixedly mounted to said housing and supports said electromagnet of said pulley assist mechanism.

11. The electrically and mechanically driven automotive accessory set forth in claim 10, wherein said stationary backing member is made of a ferrous metal material such that said electromagnet induces a magnetic loop in portions of said hub, said stationary backing member, said rotating backing member, and said pulley.

12. The electrically and mechanically driven automotive accessory set forth in claim 3, wherein said hub and said rotating backing member are integral and form a one-piece structure that is made of a ferrous metal material.

13. The electrically and mechanically driven automotive accessory set forth in claim 3, wherein said rotor assembly includes permanent magnets that are fixedly mounted to said rotating backing member and said stator assembly includes stator plates that are fixedly mounted to said housing and that support electrical windings.

14. The electrically and mechanically driven automotive accessory set forth in claim 3, wherein said hub includes a cylindrical portion that receives said input end of said shaft and wherein said pulley is supported by a pulley bearing assembly that is positioned radially between said cylindrical portion of said hub and said pulley.

15. The electrically and mechanically driven automotive accessory set forth in claim 1, wherein said housing includes a tubular portion that receives said shaft and wherein said stator assembly is mounted on said tubular portion of said housing.

16. The electrically and mechanically driven automotive accessory set forth in claim 15, wherein said pulley is supported by a shaft bearing assembly that is positioned radially between said shaft and said tubular portion of said housing.

17. The electrically and mechanically driven automotive accessory set forth in claim 1, further comprising:

an impeller fixedly mounted to said output end of said shaft.

18. The electrically and mechanically driven automotive accessory set forth in claim 1, further comprising:

a shaft seal extending annularly about said shaft and positioned radially between said shaft and said housing.

19. A method of operating an electrically and mechanically driven automotive accessory, comprising the steps of:

applying electricity to electrical windings of a stator assembly to generate an electromagnetic field and a primary torque flow path that rotationally drives a rotor assembly and a shaft fixedly connected to the rotor assembly;

rotationally driving a pulley that is rotatably supported on a pulley bearing assembly;

detecting a first rotational speed of at least one of the rotor assembly or the shaft;

detecting a second rotational speed of the pulley; and activating a pulley assist mechanism when the second rotational speed is greater than the first rotational speed, wherein said step of activating the pulley assist mechanism includes applying electricity to an electromagnet to induce a magnetic field between the pulley and claw-pole structures on the rotor assembly to create a secondary torque flow path between the pulley and the rotor assembly.

20. The method set forth in claim 19, wherein said step of activating a pulley assist mechanism produces a magnetic loop surrounding the electromagnet in portions of the stator assembly, the rotor assembly, and the pulley.

\* \* \* \* \*